June 3, 1924.
C. A. LA GRAVE
VEHICLE WHEEL
Filed Nov. 1, 1922
1,496,235
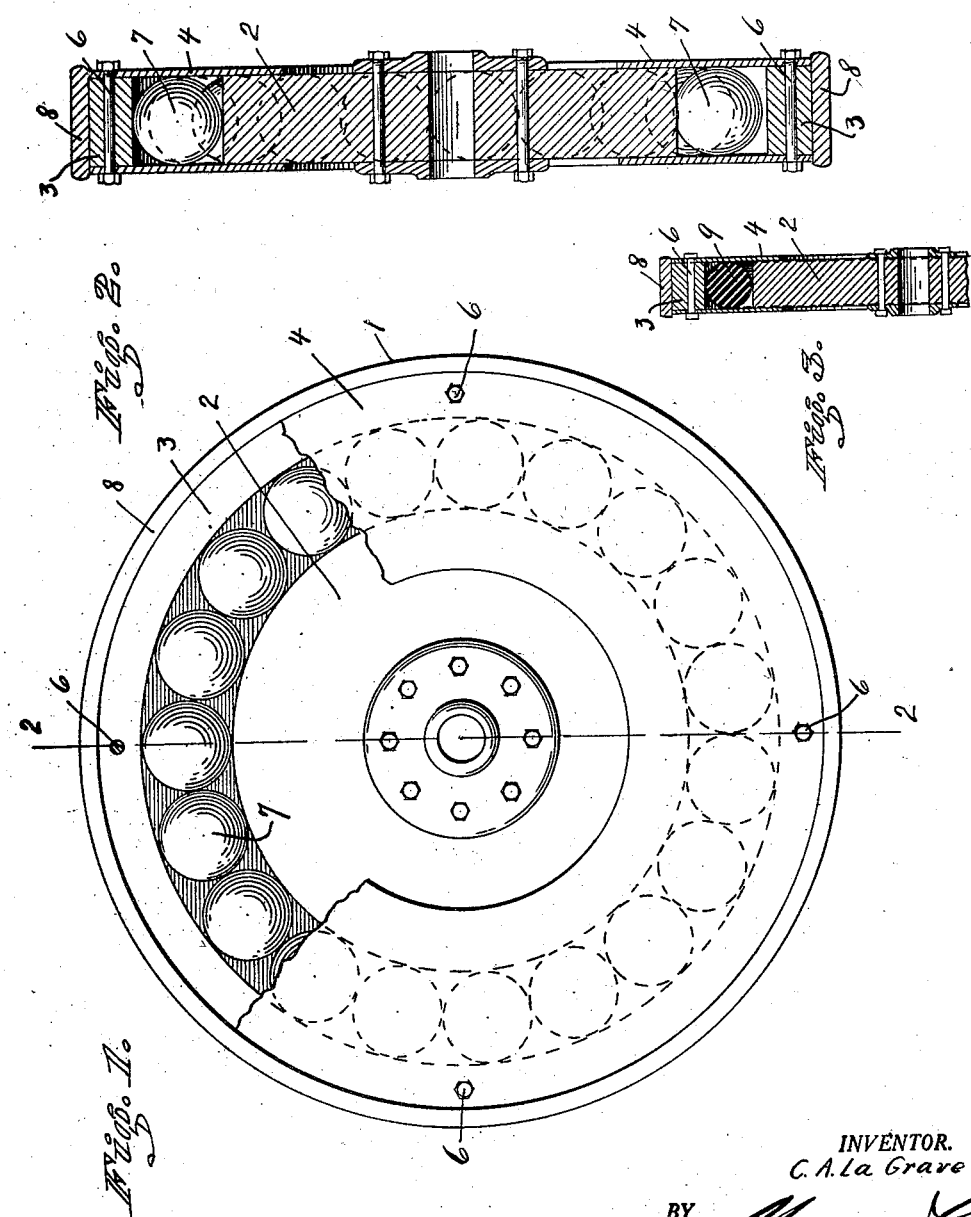
INVENTOR.
C. A. La Grave
BY
ATTORNEYS.

Patented June 3, 1924.

1,496,235

UNITED STATES PATENT OFFICE.

CHARLES A. LA GRAVE, OF HOOD, CALIFORNIA.

VEHICLE WHEEL.

Application filed November 1, 1922. Serial No. 598,385.

*To all whom it may concern:*

Be it known that I, CHARLES A. LA GRAVE, a citizen of the United States, and a resident of Hood, county of Sacramento, State of California, have invented new and useful Vehicle Wheels, of which the following is a specification.

The present invention relates to improvements in vehicle wheels and its particular object is to provide a wheel in which an inner member or disc is surrounded by a rim of larger diameter with flanges secured to one of the members telescoping over the other member so as to leave an annular space of preferably square cross section between the two members which latter space is filled with elastic material. The preferred form of the invention is shown in the accompanying drawing in which Figure 1 represents a side elevation of my wheel with certain portions broken away so as to disclose the interior; Figure 2 a vertical section through the same along line 2—2 of Figure 1; and Figure 3 a vertical section through a slightly modified form of the device, drawn to a smaller scale. While I have shown only the preferred forms of the invention it should be understood that various changes or modifications may be made within the scope of the claim hereto attached without departing from the spirit of the invention.

My wheel (1) comprises a hub member (2) preferably made in the form of a disc and a rim (3) of considerably larger diameter, the dimensions being preferably such that when the two members are arranged concentrically the annular space enclosed by the same is substantially of square cross section. The two members (2) and (3) are connected by means of flanges (4) secured to one of the members by means of bolts (6) or in any other suitable manner and slidably engaging the other member. The annular space enclosed between the four members described is filled with elastic material preferably soft rubber. This material may be arranged in the form of balls (7) made of soft rubber and dimensioned to frictionally engage all four surfaces surrounding the same as well as one another, or in the form of a solid tire (9) of circular cross-section as shown in Figure 3. The latter form is preferably used for heavier loads and the balls for lighter loads. The rim (3) is preferably provided with a rubber tread (8).

Particular attention is called to the fact that the annular space containing the elastic material is of uniform substantially square cross section and is not provided with any kind of obstruction to prevent circumferential motion of the walls or other elastic material, the frictional engagement between the elastic material and the four members enclosing the annular space being relied on altogether for preventing slipping of the elastic material.

I claim:

A vehicle wheel comprising a central disc having a smooth peripheral surface arranged parallel to the horizontal axis of the disc, a rim extending around the disc in spaced relation to said peripheral surface, spherical elastic bodies between the rim and said peripheral surface of the disc, and side flanges respectively secured to the rim and extending inwardly to slidably engage flat-wise against the sides of the disc, said spherical bodies being constantly in engagement with each other circumferentially of the disc and with the peripheral wall of said disc, the inner wall of said rim and the inner faces of said flanges.

CHARLES A. LA GRAVE.